United States Patent [19]
Ganguli et al.

[11] Patent Number: 5,998,641
[45] Date of Patent: Dec. 7, 1999

[54] DEBITTERING OF OLIVE OIL

[75] Inventors: Keshab Lal Ganguli; Karel Petrus Van Putte; Hessel Turksma; Cornelis Winkel, all of Vlaardingen, Netherlands

[73] Assignee: Unilever Patent Holdings, Vlaardingen, Netherlands

[21] Appl. No.: 08/996,429

[22] Filed: Dec. 22, 1997

[51] Int. Cl.$^6$ ....................................................... C11B 3/02
[52] U.S. Cl. .............................. 554/212; 554/7; 554/175; 436/183; 436/262; 436/267; 436/271; 426/601; 426/615; 426/417; 426/419
[58] Field of Search ................................ 584/175, 7, 212; 435/183, 262, 267, 271; 426/601, 615, 417, 419

[56] References Cited

FOREIGN PATENT DOCUMENTS

WO 96/35768  11/1996  WIPO ............................... C11B 5/00

OTHER PUBLICATIONS

Ciafardini et al, Applied and Environmental Microbiology, vol. 60, No. 11, pp. 4142–4147 (Nov. 1994).

Ranalli et al, Industrie Alimentari, vol. 33, No. 331, pp. 1073–1083 (1994).

Marsilio et al, Journal of the American Oil Chemists' Society, vol. 73, No. 5, pp. 593–597 (1996).

Ciafardini et al, Chem. Mikrobiol. Trechnol. Lebensm., 17 (5/6), 172–177 (1995).

Research Disclosure, No. 378, p. 676, (Oct. 1, 1995).

Database WPI, Section Ch, week 9315, JP 05 059 390, 1991.

Ciafardini et al, Chem. Mikrobiol. Trechnol. Lebensm, 17(576), 172–177, 1997.

Abrob. of JP 5059390, 1991.

*Primary Examiner*—Deborah D Carr
*Attorney, Agent, or Firm*—Pillsbury Madison & Sutro LLP

[57] ABSTRACT

Olive oil with a high polyphenols content and a low bitterness is obtained by exposing olive oil to an emulsified water phase which exhibits enzymatic debittering activity and/or by emulsifying with a water phase with a high polyphenols content and evaporating the water phase.

19 Claims, No Drawings

DEBITTERING OF OLIVE OIL

The present invention is concerned with non-bitter olive oil with a high content of polyphenols and with processes for preparing such olive oils.

STATE OF THE ART

Olive oil is appreciated as a salad oil and a frying oil for its delicious taste and not only in the traditional olive oil consuming countries, the Mediterranean area, but to an increasing extent also in Western Europe and the USA.

Traditionally, olive oil is prepared by harvesting the olive fruits and subjecting these to malaxation: crushing and kneading the olives so that a mash is obtained containing the whole content of the olive fruit including an aqueous phase. The mash contains also enzymes, including lipases, which have been liberated from the cells of the olive.

In order to avoid undesired olive oil hydrolysis the aqueous phase, including the olive enzymes, is quickly separated from the oil phase by decanting, anyway within one hour. Subsequent quick water washings of the crude olive oil using a centrifuge take less than a minute.

Many olive oils after decanting still possess a strong bitter taste. Bitter olive oil often can be made fit for consumption by water washing which reduces the bitter taste to an acceptable level. The bitter taste is caused by certain polyphenols. Polyphenols are compounds which are native to olive oil and which comprise compounds such as oleuropein, which is the main bitter polyphenol (Grasas y Aceites, 46, 1995, 299–303) and further tyrosol, hydroxytyrosol, caffeic acid and vanillic acid. The average polyphenols content of freshly pressed olive oil ranges from 100–300 ppm, sometimes more, depending on the type of olives and the time of harvesting. Olive oil which contains more than 300 ppm polyphenols is too bitter for consumption. These polyphenols recently have been found to play a role in enhancing the oxidation stability of olive oils. Moreover it has been discovered that the consumption of food containing polyphenols from olive oil helps to increase the oxidation stability of LDL cholesterol in the blood. A high polyphenol intake has been reported to be correlated with less incidence of coronary heart disease. Therefore the presence of a high polyphenols content in edible oils, including olive oils, is highly desirable. However, when the polyphenols in olive oil raises over 300 ppm, the bitter index K225 raises over 0.3 which is equivalent to an unacceptable bitterness.

The water washings used for reducing bitterness unfortunately also remove a substantial part of the valuable polyphenols from the olive oil. Therefore no olive oil is known with a content of polyphenols being 300–1000 ppm, while the so-called bitter index K225 is not higher than 0.3 or with a content of polyphenols being 200–300 ppm, with the bitter index being not higher than 0.2. The aim of the invention is to provide such olive oils.

Olive fruits too contain a bitter principle. Olive fruits, in order to make them fit for consumption, are soaked in water which contains a debittering agent such as lye (sodium hydroxide) or a suitable enzyme (Research Disclosure no. 378, 676).

STATEMENT OF INVENTION

We have discovered that olive oil derived polyphenols comprise oil soluble as well as water soluble polyphenols. We have found that the bitter taste of crude olive oil has to be ascribed mainly to the presence of oil soluble polyphenols, while the water soluble polyphenols, which have the same beneficial properties as the oil soluble ones, hardly contribute to the bitter taste. We have further found that the oil soluble polyphenols can easily be converted in water soluble ones and we have found a method how the water soluble polyphenols which are washed out the olive oil can be re-introduced in the olive oil.

The present invention enables the preparation of olive oil with a high content of polyphenols being 300–1000 ppm, while nevertheless the bitter index K225 is not higher than 0.3 and of olive oil with a content of polyphenols being 200–300 ppm, while the bitter index is not higher than 0.2.

The present invention enables the reduction of bitterness not by removing bitter compounds but predominantly by transforming them into compounds with less or no bitterness.

One process according to the present invention starts with bitter olive oil which possesses a high content of polyphenols. The process comprises preparing an emulsion of olive oil with an aqueous phase which contains an effective amount of a debittering enzyme, exposing the olive oil to the aqueous phase for at least one hour and finally separating the aqueous phase from the oil phase.

The second process enables the incorporation of polyphenols into non bitter olive oil without imparting a too strong bitter taste to the fortified olive oil.

To this end an aqueous solution of polyphenols is dispersed into the olive oil, whereafter the water is removed, preferably by evaporation.

DETAILS OF THE INVENTION

Debittering enzymes are present in olives fruits. The water phase of the malaxation mash of crushed olives appears to contain, besides oil hydrolysing lipases, minor but effective amounts of such enzymes, which have been liberated by the malaxation process. In the common olive oil harvesting process the water phase and the oil phase are separated quickly after malaxation, anyway not later than one hour. A part of the native debittering enzymes can be found, usually attached to fines, in the water droplets finely dispersed in the crude olive oil after decantation. Fines are present usually to an amount of 3 wt. % in decanted oil. Exposure of the olive oil to said enzymatically active aqueous dispersion have been found to soften the bitter taste, provided sufficient time is allowed.

According to an alternative embodiment the water phase to be dispersed in the olive oil is enriched with non-native debittering enzymes, preferably of the type used for debittering olive fruits.

As a result of the exposure to enzyme activity the bitter index K225 of the treated olive oil is reduced to a level being not higher than 0.3, preferably not higher than 0.2, more preferably less than 0.14, for olive oil with a polyphenol content of 300–1000 ppm and to a level being not higher than 0.2, preferably not higher than 0.1 for olive oil with a polyphenol content of 200–300 ppm.

The debittering enzymes need at least one hour to exert sufficient debittering activity, and usually more hours. Preferably the exposure time is 2–100 hours, more preferably 5–100 hours, still more preferably 24–100 hours. For practical reasons this time preferably will not extend beyond hundred hours in order to avoid the risk of undue oil hydrolysis.

A suitable amount of water phase is 0.3–200 wt. % calculated on the final olive oil emulsion and preferably is 1–50 wt. %. This amount is such that at any ambient temperature the amount exceeds the maximum solubility of water in olive oil.

An optimum contact of oil phase and water phase should be ensured e.g. by vigorous stirring so that an emulsion is formed. A nitrogen blanket on the oil prevents oxidation. As an inevitable effect of this treatment a substantial part of the converted polyphenols will migrate to the water phase. Unless the enzyme is only a glucosidase, then the conversion affords a non-bitter aglycon of oleuropein which is oil-soluble and therefore remains for the major part in the oil.

For a proper conversion of the bitter polyphenols the enzymatic agent needs to exert at least beta-glucosidase or esterase activity. Preferably the enzyme or enzymes should decompose oleuropein. Preferably, both enzyme activities are involved, e.g. in subsequent treatments. Preferably a beta-glucosidase is used characterized as EC 3.2.1.21 and an esterase characterized as EC 3.1.1.2. The beta-glucosidase can be found in various natural extracts, such as in almonds extract. Olivex™ (ex NOVO) is an enzyme preparation which primarily has pectinase activity and which is also used during the malaxation process for decomposing the cell walls of olive fruits.

Alternatively, the enzyme preparations Teazyme C™ (ex QUEST) or Laccase™ (ex NOVO) can be used. Both are able to reduce olive oil bitterness. Laccase™ has to be applied carefully because it may decompose the polyphenols to inactive compounds.

Teazyme C™ shows pectinase activity, esterase activity and also beta-glucosidase activity.

The enzymes should be present in the aqueous phase in an effective amount which means that bitterness is reduced to an organoleptically acceptable level within one to hundred hours. Suitable amounts of enzyme and exposure times can be easily established by trial experimentation.

The debittering effect of the invention is obtained not by removal of the bitter compounds, but rather by converting them to non-bitter compounds retaining the beneficial properties ascribed to polyphenols.

It has been found that the enzyme catalyzes the hydrolysis of bitter tasting polyphenols yielding polyphenols which are much more water soluble and which have a much reduced or no bitter taste. Consequently—as said before—a part of the polyphenols will migrate from the olive oil to the water phase. The separated water phase therefore contains a substantial amount of those water soluble polyphenols originally stemming from the olive oil.

Since an equilibrium partition of polyphenols between oil phase and water phase is established, it is advantageous that the water phase contains polyphenols in order to decrease the loss of polyphenols from the oil phase. Such polyphenols are selected from the group consisting of tyrosol, hydroxytyrosol, oleuropein, caffeic acid and vanillic acid.

Non bitter olive oil which contains a high polyphenol content can be prepared by debittering olive oil while retaining its high polyphenol content, as describe before, or the other way around by starting from non bitter olive oil and increase its polyphenol content, preferably in a natural way, as will be described now.

When employing common olive oil harvesting operations, the water separated from olive oil after malaxation or washing may contain 300–2000 ppm of polyphenols. Usually this is discarded as waste water. We have found that this water phase, which is a natural source of olive oil polyphenols, can be used for fortification of olive oil with polyphenols.

Accordingly, olive oil is fortified with polyphenols by dispersing a small amount, suitably 0.1–15 wt. % on oil, of an aqueous solution of water soluble, non-bitter polyphenols into olive oil and then removing the water, preferably by evaporating it under reduced pressure at ambient temperature. Slight amounts of bitter polyphenols can be allowed. The polyphenols, being not volatile at ambient temperature, will be re-introduced into the olive oil, in dissolved form and also in suspended form if the oil is saturated with polyphenols. Suspended polyphenols will impart a haze to the oil. Consequently the polyphenols content of the olive oil will be increased considerably, while the bitterness value will only slightly be influenced. In this way olive oil can be prepared with a polyphenols content, depending on the starting level, being 300–1000 ppm and a bitter index being not higher than 0.3 or olive oil with a polyphenols content being 200–300 ppm and a bitter index being not higher than 0.2.

Suitable aqueous solutions preferably are water phases separated from olive oil, particularly after an enzyme treatment. The concentration of polyphenols in the aqueous solution may be increased e.g. by evaporating under reduced pressure a part of the water or, preferably, by membrane filtration. Aqueous solutions containing up to 5000 ppm of polyphenols can be obtained in this way.

The olive oil which is to be fortified may be the olive oil from which the polyphenols originate, it may be another olive oil, a virgin oil or a refined oil, or even another edible oil not being olive oil. The aqueous polyphenols solution may be used too for the fortification of other food compositions.

The present invention comprises novel olive oils which are distinguished from known olive oils in that they combine a high content of polyphenols amounting 300 to 1000 ppm, with a low value for the bitter index K225, being not higher than 0.3, preferably being not higher than 0.2 and more preferably being less than 0.14 or a content of polyphenols amounting 200–300 ppm, with a K225 being not higher than 0.2, preferably being not higher than 0.1.

The invention is illustrated by the following examples:

GENERAL

The polyphenols content of olive oil is established by the colorimetric method described in J.Am.Oil.Chem.Soc. 1981, 11, pp. 966–968, which method is based on the reaction of a methanolic extract of olive oil and the Folin-Ciocalteau reagent.

Bitterness is expressed by the bitter index value denoted by the UV-absorption parameter K225. The measurement has been carried out according to J.Am.Oil.Chem.Soc, 1992, 69(4), 394–395:

1 g of olive oil is dissolved in 4 ml of hexane and passed over an octadecyl ($C_{18}$) disposable extraction column (6 ml) (SPE extraction unit from Baker Chemical Company). The octadecyl column is previously activated with 6 ml of methanol and washed with 6 ml of hexane. The sample vial is cleaned with 4 ml of hexane which is applied to column after which the column is washed with 6 ml of hexane. The column is sucked dry and the adsorbed substances are eluted with 25 ml of methanol/water (50/50, V/V), after which the absorbance of the eluted solution is measured at 225 nm against methanol/water (50/50, V/V). The bitter index is expressed as the extinction at 225 nm of 1 gram olive oil/100 ml of methanol/water (50/50, v/v).

A reliable correlation exists between bitter index and sensorical bitterness perception. See the mentioned article and Table I.

TABLE I

| Bitter index K225 | Bitterness perception |
|---|---|
| <0.14 | hardly bitter |
| 0.14–0.25 | moderately bitter |
| 0.25–0.36 | bitter |
| >0.36 | very bitter |

EXAMPLE 1

A mixture is prepared containing 150 g of olive oil and 30 ml of water adjusted at pH=5 with a citric acid/phosphate buffer. The water phase contains 240 mg of an almonds beta-glucosidase (EC 3.2.1.21, ex SIGMA) preparation corresponding with 1680 units.

A glucosidase unit is defined as the amount which liberates per minute 1 micromole of glucose from salicin at pH=5.0 and T=37° C.

The mixture is stirred vigorously for 24 hours at 25° C. Then the water phase is separated by decantation.

Table II shows that exposure to a relatively small amount of an aqueous enzyme solution causes a considerable reduction of the bitterness.

TABLE II

| Olive oil exposed to enzyme | Bitter-index K225 |
|---|---|
| Before treatment | 0.201 |
| After treatment | 0.029 |
| Commercial olive oil | 0.08 |

An aqueous solution of polyphenols was obtained by collecting the water which separates from olive oil which had been obtained by decantation after malaxation. Decanted olive oil still contains 1–20% of water, which is dispersed through the oil. By settling it separates within 1–5 days. Usually the water is removed quickly after malaxation by centrifuging. The separated water contains 300–2000 ppm of water soluble polyphenols.

One liter of extra virgin olive oil (oil A) having a bitter index of 0.35 was stirred at 20° C. under reduced pressure (10,000 Pascal, 100 mbar) with 0.1 l of separated olive oil water (see above), containing 900 ppm of polyphenols, until the water had evaporated.

The procedure was repeated with four other oils B, C, D and E originating from different olive oil mills, using water phases containing 700, 650, 400 and 4000 ppm polyphenols respectively. Table III shows the bitter index and the polyphenols content before and after the treatment.

TABLE III

| Oils | BEFORE TREATMENT | | AFTER TREATMENT | |
|---|---|---|---|---|
| | K225 | Polyphenols | K225 | Polyphenols |
| A | 0.35 | 330 ppm | 0.2 | 420 ppm |
| B | 0.32 | 290 ppm | 0.2 | 360 ppm |
| C | 0.28 | 280 ppm | 0.18 | 345 ppm |
| D | 0.25 | 200 ppm | 0.09 | 240 ppm |
| E | 0.5 | 500 ppm | 0.2 | 900 ppm |

EXAMPLE 3

One liter of decanted olive oil containing 2.2 wt. % of water and 3 wt. % of fines was slowly stirred at 30° C. under nitrogen. The development of bitterness and polyphenol content is shown in Table IV.

The values for free fatty acids show that oil hydrolysis is very slow and acceptable.

TABLE IV

| Days | Water % | Polyphenols ppm[1] | Bitter index K225 | FFA % |
|---|---|---|---|---|
| 0 | 1.68 | 746 | 0.42 | 0.303 |
| 1 | 1.69 | 724 | 0.38 | 0.306 |
| 7 | 1.71 | 711 | 0.28 | 0.308 |
| 10 | 1.65 | 693 | 0.24 | 0.312 |
| 14 | 1.69 | 611 | 0.20 | 0.314 |

[1]expressed as caffeic acid

EXAMPLE 4

According to example 1 a mixture is prepared containing 150 g of olive oil and 30 ml of water adjusted at pH=5 with a citric acid/phosphate buffer. The water phase contains 240 mg of an almonds beta-glucosidase (EC 3.2.1.21, ex SIGMA) preparation corresponding with 1680 units.

The mixture is stirred vigorously for 24 hours at 25° C. Then the water phase is separated by decantation.

The treatment is repeated under the same conditions but with a water phase which contains 1000 units of esterase (EC 3.1.1.2, ex BOEHRINGER). An esterase unit is defined as the amount which hydrolyses per minute 1 micromole of ethyl butyrate into butyric acid and ethanol at pH=8 and T=25° C.

Table V shows that subsequent exposure to different enzymes enhances the debittering effect. The polyphenols content decreases too, but less than proportional to the bitterness decrease.

TABLE V

| Olive oil exposed to two enzymes | Total polyphenols | Bitter-index K225 |
|---|---|---|
| Before treatment | 300 | 0.243 |
| After beta glucosidase treatment | 216 | 0.102 |
| After esterase treatment | 129 | 0.046 |

We claim:

1. An olive oil containing 300–1000 ppm polyphenols, and having a bitter index K225 which is not higher than 0.3.

2. An olive oil containing 200–300 ppm polyphenols and having a bitter index K225 which is not higher than 0.2.

3. An olive oil according to claim 1 which has a bitter index less than 0.14.

4. A process for obtaining an olive oil according to any one of claims 1–3, which comprises preparing an emulsion of olive oil with an aqueous phase which aqueous phase contains an effective amount of a debittering enzyme, exposing the olive oil to the aqueous phase for at least one hour and separating the aqueous phase from the oil phase, when the treated oil contains at least 200 ppm polyphenols.

5. A process according to claim 4, where the treatment is repeated with another different debittering enzyme.

6. A process according to claim 4, where the aqueous phase amounts to 0.3–200 wt. % calculated on the emulsion.

7. A process according to claim 4, where the exposure time is 2–100 hours.

8. A process according to claim 4, where the enzyme is able to decompose oleuropein.

9. A process according to claim 4, where an olive native enzyme is used and no other enzyme is added.

10. A process according to claim 4, where the enzyme has beta-glucosidase activity.

11. A process according to claim 10, where the enzyme is the beta-glucosidase EC 3.2.1.21.

12. A process according to claim 4, where the enzyme has esterase activity.

13. A process according to claim 12, where the enzyme is the aryl esterase EC 3.1.1.2.

14. A process according to claim 4, where an aqueous phase is added which contains besides the enzyme at least one polyphenol selected from the group consisting of tyrosol, hydroxytyrosol, oleuropein, caffeic acid and vanillic acid.

15. A process for obtaining olive oil according to claim 1 or 2, comprising the steps
   a. selecting a non bitter olive oil,
   b. selecting an aqueous solution of non-bitter polyphenols,
   c. dispersing the aqueous solution into the olive oil,
   d. removing the water from the dispersion, where the starting oil and the aqueous solution are selected such that both the polyphenols content and the bitter index of the resulting oil fit into the ranges of claim 1 or claim 2.

16. A process according to claim 15, where the aqueous solution contains 300–5000 ppm of polyphenols.

17. A process according to claim 15, where the added aqueous solution amounts to 0.1–15 vol. % on oil.

18. A process according to claim 15, where the water is removed by evaporation under reduced pressure.

19. An olive oil according to claim 1 or claim 2 wherein the polyphenols are water-soluble.

* * * * *